2,784,235

METHOD FOR PREPARING SUBSTITUTED DIALDEHYDES

Curtis W. Smith and Douglas G. Norton, Berkeley, Calif., assignors to Shell Development Company, New York, N. Y., a corporation of Delaware No Drawing. Application November 29, 1954, Serial No. 471,887

17 Claims. (Cl. 260—602)

This invention relates to a process for the preparation of aliphatic dialdehydes containing an ether linkage. More particularly, this invention relates to a cyclic process for producing hydrocarbyloxy - methyl - substituted glutaraldehydes by reacting methacrolein or homologous alpha-methylene aldehydes with alcohols in the presence of carefully controlled amounts of caustic hydroxides or oxides.

In our copending application Serial No. 16,617, filed March 23, 1948, now U. S. Patent 2,702,823, issued on February 22, 1955, of which the present application is a continuation-in-part, we disclose that a new class of valuable substituted glutaraldehydes can be prepared by reacting an alpha-methylene aldehyde with an alcohol in the presence of a caustic hydroxide or oxide as catalyst, the kind and amount of such catalyst being the critical factors in the production of the substituted glutaraldehydes.

In this application, our invention comprises the discovery that the yield of these new substituted glutaraldehydes may be substantially increased by carrying out the reaction of the alpha-methylene aldehyde and the alcohol in a cyclic manner wherein the final reaction mixture is freed of the glutaraldehyde product and at least a portion of the product-free mixture is added to the initial reaction mixture for the next cycle.

The reaction of an alpha-methylene aldehyde and an alcohol to produce a substituted glutaraldehyde is believed to proceed in two steps, according to the equations

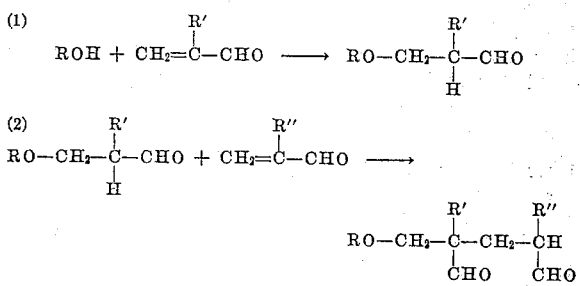

wherein R and R' represent hydrocarbon groups.

The relative rates of these two reactions are believed to be primarily determined by three factors: the kind and amount of the catalyst and the temperature. By controlling these three factors within the limits to be herein described, reaction 2 becomes dominant and the primary product is the substituted glutaraldehyde, with but a minor amount of the beta-hydrocarbyloxyaldehyde left. Likewise, these two reactions are believed to provide an explanation for the discovery that addition of the glutaraldehyde-free reaction mixture—known to contain minor, but substantial amounts of the beta-hydrocarbyloxyaldehyde—to the initial reaction mixture of alcohol, alphamethylene aldehyde and catalyst results in substantially higher yields of the glutaraldehyde product. The evidence shows that the beta-hydrocarbyloxyaldehyde by-product is an excellent source of the substituted glutaraldehyde.

The process embodying these discoveries comprises a cyclic process in which the alpha-methylene aldehyde is reacted with the alcohol at a temperature within the range of from about 0° C. to about 50° C. in the presence of a caustic hydroxide or oxide as catalyst, in an amount sufficient to give a concentration of catalyst of from about 0.001 to about 0.4 gram-equivalent of catalyst per liter of reaction mixture, the glutaraldehyde product is separated and at least a part of the product-free reaction mixture boiling below the boiling point of the glutaraldehyde product is added to the initial reaction mixture for the next cycle. The reaction is preferably carried out in a substantially anhydrous reaction system.

The desired reaction goes forward at a practical rate at any temperature from about 0° C. to about 50° C. Temperatures above about 50° C. are undesirable since polymerization of the unsaturated aldehyde increases with increase in temperature. Temperatures within the upper portion of the permissible range tend to favor the production of substituted glutaraldehyde over beta-hydrocarbyloxyaldehyde: therefore, temperatures of from about 15° C. to about 40° C. are preferred.

The desired reaction is catalyzed by a caustic hydroxide or oxide. Included within this class of catalysts are the alkali metal hydroxides or oxides and the quarternary ammonium hydroxides, such as benzyltrimethylammonium hydroxide and tetramethylammonium hydroxide, and the like. The preferred catalyst is sodium hydroxide, because of its availability and low cost.

The amount of the catalyst used is critical. If an excessive amount of catalyst is present, polymerization of the unsaturated aldehyde is promoted; if an insufficient amount of catalyst is present, the desired reaction does not take place. Amounts of the catalyst sufficient to provide a concentration in the reaction mixture of from about 0.001 to about 0.4 gram-equivalent per liter are generally effective. A catalyst concentration of from about 0.01 to about 0.08 equivalent per liter is preferred, for at these catalyst concentration levels, maximum yields of substituted-glutaraldehyde and minimum yields of polymeric, inert by-products are produced.

It is preferred that the reaction mixture be maintained in a substantially anhydrous state, since water tends to cause polymerization of the unsaturated aldehyde, and to inhibit the desired reaction. It is preferred that the catalyst be added in anhydrous, finely divided form, but if desired, the catalyst may be added in the form of a suitable concentrated aqueous solution. Because of the small amounts of catalyst used, the amount of water thereby introduced into the reaction mixture is not harmful.

Inert organic solvents—e. g., ethers, hydrocarbons, heterocyclic oxygen-containing solvents, such as dioxane, etc.—may be included in the reaction mixture, as when higher alcohols are reacted, although the presence of an added solvent in all cases is not a prerequisite to operability of the process.

The process of the invention is executed by mixing the unsaturated aldehyde and the alcohol in the presence of the catalyst. Molar ratios of the alcohol to the unsaturated aldehyde of from about 1:2 to about 10:1 may be employed. A preferred range is from about 1:1 to about 5:1. The reaction mixture may be prepared by adding the catalyst to the alcohol and the recycled material and thereafter adding the unsaturated aldehyde, by first mixing the aldehyde, alcohol and recycled material and then adding the catalyst to the mixture, or by simultaneously mixing all four components. The first mentioned procedure is preferred, for when the aldehyde is slowly added to the solution of the catalyst in the alcohol and the recycled material, maximum yields of glutaraldehyde product are favored.

Reaction times of from about ½ hour to about 10 or more hours may be employed; generally, however, reaction times of from about 2 to about 6 hours are adequate. During the reaction period, the temperature of the reaction mixture is kept within the desired limits by heating or cooling, as necessary.

Following completion of the reaction, the catalyst may be neutralized by the careful addition of acid to the reaction mixture. Any suitable acid may be employed; however, formic acid has the unique advantage that small excesses do not cause undesired reactions that may result from the presence of corresponding amounts of other acids. Buffer mixtures also may be employed to neutralize the basic catalyst. After the catalyst has been neutralized, the desired products may be recovered from the reaction mixture, as by fractional distillation.

The portion of the glutaraldehyde-free reaction mixture which may usefully be added to the initial reaction mixture for the next cycle comprises part or all of the mixture which boils below the boiling point of the glutaraldehyde product. The material remaining (bottoms) after distillation of the glutaraldehyde consists primarily of tarry materials resulting from polymerization of the unsaturated aldehyde. This bottoms product has no known value in the new process. The material boiling below the glutaraldehyde comprises unreacted alcohol, unreacted unsaturated aldehyde and the beta-hydrocarbyloxyaldehyde intermediate product. Very small amounts of other by-products may also be present. While the mixture may be separated into its various components and these components each separately used in the next cycle, it is obviously convenient and advantageous to use the crude mixture, adding to it sufficient fresh alcohol, unsaturated aldehyde and catalyst to provide the correct initial mixture for the next cycle of the process. All, or any part, of the reaction mixture boiling below the glutaraldehyde may be used, as may be convenient or desirable in view of the neceessary relationships which should be maintained among the various components of the reaction mixture.

As an illustration of this aspect of the invention, attention is called to the working example included hereinafter. In that example methacrolein and methanol were the reactants. The crude product, following neutralization of the catalyst, was distilled into two fractions: a first fraction including all material boiling up to 60° C. at 0.1 mm. mercury pressure and a second portion boiling within the range 60° C. to 64° C. at 0.1 mm. mercury pressure. The first fraction was found to comprise primarily unreacted methanol, unreacted methacrolein and beta-methoxy-isobutyraldehyde. The second fraction was found to be alpha, gamma-dimethyl-alpha-(methoxymethyl) glutaraldehyde. In this example, all of the first fraction—i. e., all of the beta-methoxyisobutyraldehyde was passed to the next cycle. Similarly, where the alcohol reactant is allyl alcohol, the material useful in preparing further yields of the glutaraldehyde is that lying below about 67° C. at 0.5 mm. mercury pressure, the boiling point of the glutaraldehyde product. The following table shows the cut-off point for various other alchohols.

TABLE I

| Alcohol | Cut off temperature, °C. | Pressure (mm. mercury) |
| --- | --- | --- |
| Ethyl alcohol | 71 | 0.5 |
| Isopropyl alcohol | 76 | 0.5 |
| Methallyl alcohol | 91 | 0.5 |
| Ethylene Glycol | 130 | 0.5 |
| 3,3-dimethyl-1-1pentanol | 125 | 1.4 |

As the alcohol reactant there may be employed any monohydric alcohol ROH wherein R represents a hydrocarbyl group.

It is preferred that R represent an aliphatic hydrocarbyl group, which term includes both unsubstituted and substituted aliphatic hydrocarbyl groups. It is preferred that the group represented by R contain not more than about 18 carbon atoms and even more preferable that the group R contain from 1 to about 8 carbon atoms. Representative groups of this class include the alkyl groups such as the methyl, ethyl, propyl, and isopropyl groups, together with the various butyl, pentyl and hexyl groups. Also included in this class are the substituted alkyl groups in which one or more of the hydrogen atoms have been replaced by suitable substituent groups. Suitable substituent groups include, among others, aromatic groups, e. g., the phenyl, naphthyl, tolyl, xylyl and like groups, cycloaliphatic groups such as the cyclohexyl, cyclopentyl and cycloheptyl groups, unsaturated hydrocarbon groups such as the vinyl, allyl, isopropenyl, isocrotyl, 2,4-butadienyl and pentadienyl groups, as well as the ethynyl, 1- and 2-propynyl and like acetylenically unsaturated groups, alkoxy groups such as the methoxy and ethoxy groups, the hydroxyl group, halogen atoms, such as the chlorine and bromine atoms, nitro, sulfo or like groups. Also coming within the scope of symbol R are the unsaturated aliphatic hydrocarbon groups, such as the alkenyl groups, the allyl-type groups being preferred. By the term "allyl-type groups" is meant those groups wherein the terminal carbon atom having the free valence bond is also attached through a single bond to a second carbon atom which in turn is directly attached through a double bond to a third carbon atom. The valence bonds of the three carbon atoms other than the free valence bond on the terminal carbon atom of the group may be satisfied by union with hydrogen atoms or with suitable other atoms or structural groupings. They may be attached for example, to alkyl radicals, such as the methyl, propyl, butyl, hexyl, octyl or decyl radicals, or to aromatic or cycloaliphatic radicals, such as the phenyl or tolyl, cyclohexyl or cyclopentyl radicals, to a halogen atom, to an alkoxy group, etc.

Representative allyl-type groups include, in addition to the allyl group, the methallyl, crotyl, chlorallyl, methoxyallyl, 2-ethylallyl, 2-propylallyl, 2-methylcrotyl, 2-butylallyl, 2-propyl-2-pentenyl, 2-isopropylpentenyl, 2,4-pentadien-1-yl, 2-cyclohexylallyl and like groups.

An especially desirable class of compounds coming within the class of beta, gamma olefinically unsaturated hydrocarbon groups represented by the symbol R are the vinyl type compounds having the configuration

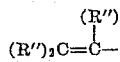

wherein R" represents a hydrogen atom or the substituent groups outlined above in regard to the allyl-type compounds.

Suitable alcohols thus include, among others, ethyl alcohol, methyl alcohol, propyl alcohol, isopropyl alcohol, the butyl alcohols and homologs thereof, such as the pentyl alcohols, the hexyl alcohols, the octyl alcohols, the nonyl alcohols, and even alcohols such as decanol, dodecanol, tetradecanol, hexadecanol, and octadecanol and their branched-chain analogs. Unsaturated alcohols, including allyl alcohol, methallyl alcohol, crotyl alcohol, cinnamyl alcohol, 2-pentenol, 2-ethyl-2-butenol, 2-isopropyl-2-hexenol, and even propargyl alcohol also may be employed.

As the alpha-methylene aldehyde, there may be employed any aldehyde having the formula

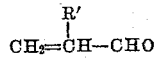

wherein the symbol R' represents a hydrocarbyl group, preferably an alkyl, cycloalkyl, aryl, alkaryl or aralkyl group. It is preferred that R' represent a lower alkyl group such as a methyl, ethyl, propyl, isopropyl, butyl, pentyl or a hexyl group, the latter three groups being of either straight-chain or branched-chain configuration.

The aldehyde reactant may thus be characterized as an alpha-methylene aldehyde containing at least four carbon atoms, the alpha carbon atom being tertiary in configuration and the beta carbon atom being of primary configuration.

Suitable unsaturated aldehydes which may be employed in the process of the invention for the preparation of novel substituted glutaraldehydes to which the invention relates include, in addition to methacrolein, the following: Alpha-ethylacrolein, alpha-propylacrolein, alpha-isopropylacrolein, alpha-cyclohexylacrolein, alpha-phenylacrolein, alpha-octylacrolein, alpha-decylacrolein, and homologous and analogous substituted acroleins wherein the alpha carbon atom is tertiary and the beta carbon atom is primary.

The following example is presented for the purpose of illustrating certain of the specific embodiments of the invention. Although in the example certain properties of the products are referred to in quantitative terms, it will be appreciated that these are based on the results that were observed in particular experiments. While these properties, as given, will be of assistance in identifying and characterizing the products, we do not regard them as limiting the invention, since they are the results of individual experiments, and minor variations in the observed properties of a compound from one preparation to the next are more the rule than the exception in the art of preparative organic chemistry.

Example I

In this experiment, there is illustrated the cyclic process of producing the substituted glutaraldehydes to which the invention relates, characterized by the desirably high yields of the desired product. Methacrolein, 140 grams, was added dropwise to a solution prepared by mixing 4.15 milliliters of 2 N aqueous solution of NaOH with 192 grams of methanol. The rate of addition was controlled so that the heat of reaction maintained the mixture of 30° C. After all the methacrolein had been added, the solution was allowed to stand one hour. The reaction mixture then was neutralized by addition of formic acid, and distilled. The first fraction, amounting to 229 grams, was collected at temperatures up to 60° C. under 0.1 millimeter of mercury pressure. The second fraction, amounting to 96.5 grams, was collected between 60° C. and 64° C. under 0.1 millimeter of mercury pressure and a residue of 13.3 grams was allowed to remain in the still kettle. The second fraction, which was the alpha, gamma-dimethyl-alpha-(methoxy-methyl)glutaraldehyde, represented a 56% conversion of methacrolein to product.

The lower boiling of the two fractions taken, containing unreacted methocrolein, methanol, and by-products of the reaction, was mixed with 18 grams of methanol and 4.15 milliliters of 2 N aqueous NaOH solution, with stirring. The temperature of the mixture was maintained at about 30° C. with occasional cooling for an hour. Then 95 grams of methacrolein was added dropwise over another hour. After the solution had stood for an additional hour it was neutralized by the addition of formic acid, and distilled from a Claisen flask. Alpha, gamma-dimethyl-alpha - (methoxymethyl)glutaraldehyde was recovered as the fraction distilling between 80° and 90° C. under about one millimeter of mercury, in the amount of 97.5 grams. The product obtained represented a 90% conversion of the methacrolein added in the recycle stage of the process. The only loss, other than handling losses, appeared to be the residue formed in the reaction. In the entire experiment, the residue amounted to about 10% by weight of the methacrolein employed, indicating an overall yield in successive operations of about 90% based upon the methacrolein employed.

Sodium oxide is equivalent to sodium hydroxide as catalyst in this reaction.

We claim as our invention:

1. A cyclic process for the production of an alpha, gamma-dialkyl-alpha-(hydrocarbyloxymethyl)glutaraldehyde which comprises condensing an alphamethylene alkanal containing at least four carbon atoms with an alcohol in which the hydroxyl radical is linked directly to a hydrocarbyl group, under substantially anhydrous conditions and in the presence of a member of the group consisting of the caustic hydroxide and caustic oxides as catalyst, the quantity of said caustic catalyst being sufficient to provide a concentration of from about 0.001 to about 0.4 gram-equivalent of said catalyst per liter of reaction mixture, separating an alpha, gamma-dialkyl-alpha-(hydrocarbyloxymethyl)glutaraldehyde as product from the resulting reaction mixture, and adding at least a part of the reaction mixture boiling below the boiling point of said glutaraldehyde product to the initial reaction mixture of the next cycle of the process to produce additional quantities of said glutaraldehyde product.

2. The process of claim 1 in which the condensation of the alcohol and the alpha-methylene alkanal is carried out at a temperature within the range of from about 0° C. to about 50° C.

3. A cyclic process for the production of an alpha, gamma-dialkyl-alpha-(hydrocarbyloxymethyl)glutaraldehyde which comprises condensing an alphamethylene alkanal containing at least four carbon atoms with an alcohol in which the hydroxyl radical is linked directly to a hydrocarbyl group, under substantially anhydrous conditions and in the presence of a caustic hydroxide as catalyst, the quantity of said caustic catalyst being sufficient to provide a concentration of from about 0.001 to about 0.4 gram-equivalent of said catalyst per liter of reaction mixture, to produce a reaction mixture comprising said alpha, gamma-dialkyl-alpha-(hydrocarbyloxymethyl)glutaraldehyde and a beta-hydrocarbyloxyaldehyde formed by condensation of one mole of said alcohol with one mole of said alpha-methylene alkanal, separating the said alpha, gamma-dialkyl-alpha-(hydrocarbyloxymethyl)glutaraldehyde as product from the mixture and adding at least a part of said beta-hydrocarbyloxyaldehyde to the initial reaction mixture of the next cycle of the process to produce additional amounts of said glutaraldehyde product.

4. A process according to claim 3 wherein the alcohol is an aliphatic alcohol.

5. A process according to claim 3 wherein the alcohol is an alkanol.

6. A cyclic process for preparing alpha, gamma-dimethyl-alpha-(methoxymethyl)glutaraldehyde which comprises condensing methacrolein with methyl alcohol under substantially anhydrous conditions at a temperature of from about 15° C. to about 45° C. and in the presence of sodium hydroxide in an amount sufficient to provide from about 0.001 to about 0.4 gram-equivalent of sodium hydroxide per liter of reaction mixture, separating the alpha, gamma-dimethyl-alpha-(methoxymethyl)-glutaraldehyde from the resulting reaction mixture and passing at least a part of the resulting glutaraldehyde-free reaction mixture boiling below the boiling point of said glutaraldehyde together with additional amounts of fresh methacrolein, methyl alcohol and sodium hydroxide to the next cycle of the process.

7. A cyclic process for preparing alpha, gamma-dimethyl-alpha-(allyloxymethyl)glutaraldehyde which comprises condensing methacrolein with allyl alcohol under substantially anhydrous conditions at a temperature of from about 15° C. to about 45° C., and in the presence of sodium hydroxide in an amount sufficient to provide from about 0.001 to about 0.4 gram-equivalent of sodium hydroxide per liter of reaction mixture, separating the alpha, gamma-dimethyl-alpha-(allyloxymethyl)- glutaraldehyde from the resulting reaction mixture and passing at least a part of the resulting glutaraldehyde-free reaction mixture boiling below the boiling point of said glutaraldehyde, together with additional amounts of fresh methacrolein, allyl alcohol and sodium hydroxide to the next cycle of the process.

8. A process for the production of an alpha, gamma-dialkyl-alpha-(alkoxymethyl)glutaraldehyde which comprises condensing an alpha-methylene-alkanal containing at least four carbon atoms with an alkanol in the presence of a caustic hydroxide as catalyst under substantially anhydrous conditions and in the presence of an added amount of an alpha-alkyl, beta-alkoxyaldehyde in which the alkoxy group is the same as the alkoxy group of the alkanol, the quantity of said caustic catalyst being sufficient to provide a concentration of from about 0.001 to about 0.4 gram-equivalent of said catalyst per liter of reaction mixture.

9. A cyclic process for preparing a substituted glutaraldehyde characterized in that one carbon atom to which a formyl group is directly linked is a tertiary carbon atom and the other carbon atom to which a formyl group is directly linked is a quaternary carbon atom, said quaternary carbon atom being linked directly to a methyl group which has one hydrogen replaced by an oxygen atom which in turn is directly linked to a hydrocarbyl group, said process comprising condensing an alpha-methylene aldehyde containing at least 4 carbon atoms with an alcohol in which the hydroxyl radical is directly linked to a hydrocarbyl group, under substantially anhydrous conditions in the presence of a member of the group consisting of the caustic hydroxides and caustic oxides as catalyst, the quantity of said caustic catalyst being sufficient to provide a concentration of from about 0.001 to about 0.4 gram-equivalent of said catalyst per liter of reaction mixture, separating a substituted glutaraldehyde of the character set out hereinbefore as product from the resulting reaction mixture and adding at least a part of the reaction mixture boiling below the boiling point of said substituted glutaraldehyde product to the initial reaction mixture of the next cycle of the process to produce additional quantities of said substituted glutaraldehyde product.

10. The process of claim 9 in which the condensation of the alcohol and the alpha-methylene aldehyde is carried out at a temperature within the range of from about 0° C. to about 50° C.

11. A cyclic process for the production of an alpha,-gamma-dihydroxycarbyl-alpha-(hydrocarbyloxymethyl)-glutaraldehyde which comprises condensing an alpha-methylene aldehyde containing at least 4 carbon atoms with an alcohol in which the hydroxyl radical is linked directly to a hydrocarbyl group, under substantially anhydrous conditions and in the presence of a member of the group consisting of the caustic hydroxides and caustic oxides as catalyst, the quantity of said caustic catalyst being sufficient to provide a concentration of from about 0.001 to about 0.4 gram-equivalent of said catalyst per liter of reaction mixture, separating an alpha,-gamma-dihydrocarbyl-alpha-(hydrocarbyloxymethyl)-glutaraldehyde as product of the resulting mixture and adding at least a part of the reaction mixture boiling below the boiling point of said glutaraldehyde product to the initial reaction mixture of the next cycle of the process to produce additional quantities of said glutaraldehyde product.

12. The process of claim 11 in which the condensation of the alcohol and the alpha-methylene alkanal is carried out at a temperature within the range of from about 0° C. to about 50° C.

13. A cyclic process for preparing a substituted glutaraldehyde characterized in that one carbon atom to which a formyl group is directly linked is a tertiary carbon atom and the other carbon atom to which the formyl group is directly linked is a quaternary carbon atom, said quaternary carbon atom being directly linked to a methyl group which has one hydrogen atom replaced by an oxygen atom which in turn is directly linked with a hydrocarbyl group, said process comprising condensing an alpha-methylene aldehyde containing at least 4 carbon atoms with an alcohol in which the hydroxyl radical is linked directly to a hydrocarbyl group under substantially anhydrous conditions in the presence of a caustic hydroxide as catalyst and in the presence of an added amount of the condensation product of one mole of said alcohol with the double bond of one mole of said aldehyde, the quantity of said caustic catalyst being sufficient to provide a concentration of from about 0.001 to about 0.4 gram-equivalent of said catalyst per liter of reaction mixture.

14. The process for the production of an alpha-gamma-dihydrocarbyl-alpha-(hydrocarbyloxymethyl)-glutaraldehyde which comprises condensing an alpha-methylene aldehyde containing at least 4 carbon atoms with an alcohol in which the hydroxyl radical is linked directly to a hydrocarbyl group, under substantially anhydrous conditions in the presence of a caustic hydroxide as catalyst and in the presence of an added amount of an alpha-hydrocarbyl,beta-hydrocarbyloxyaldehyde in which the hydrocarbyloxy group is the same as the hydrocarbyloxy group of the alcohol, the quantity of said caustic catalyst being sufficient to provide a concentration of from about 0.001 to about 0.4 gram-equivalent of said catalyst per liter of reaction mixture.

15. The process for the production of a substituted glutaraldehyde characterized in that one carbon atom to which a formyl group is directly linked to a tertiary carbon atom and the other carbon atom to which a formyl group is directly linked is a quaternary carbon atom, said quaternary carbon atom being directly linked to a methyl group which has one hydrogen atom replaced by an oxygen atom which in turn is directly linked to a hydrocarbyl group, said process comprising condensing an alpha-methylene aldehyde containing at least 4 carbon atoms with an alpha-hydrocarbyl,beta-hydrocarbyloxyaldehyde in the presence of a caustic hydroxide as catalyst under substantially anhydrous conditions the quantity of said caustic catalyst being sufficient to provide a concentration of from about 0.001 to about 0.4 gram-equivalent of said catalyst per liter of reaction mixture.

16. A process for the production of an alpha,gamma-dihydrocarbyl-alpha-(hydrocarbyloxymethyl)glutaraldehyde which comprises condensing an alpha-methylene aldehyde containing at least 4 carbon atoms with an alpha-hydrocarbyl,beta-hydrocarbyloxyaldehyde in the presence of a caustic hydroxide as catalyst under substantially anhydrous conditions the quantity of said caustic catalyst being sufficient to provide a concentration of from about 0.001 to about 0.4 gram-equivalent of said catalyst per liter of reaction mixture.

17. A process for the production of an alpha,gamma-dialkyl-alpha-(alkoxymethyl)glutaraldehyde which comprises condensing an alpha-methylene alkanal containing at least four carbon atoms with an alpha-alkyl beta-alkoxyaldehyde in the presence of a caustic hydroxide as catalyst under substantially anhydrous conditions, the quantity of said caustic catalyst being sufficient to provide a concentration of from about 0.001 to about 0.4 gram-equivalent of said catalyst per liter of reaction mixture.

References Cited in the file of this patent

UNITED STATES PATENTS

| | | |
|---|---|---|
| 2,495,313 | Bludworth et al. | Jan. 24, 1950 |
| 2,504,680 | Gresham | Apr. 18, 1950 |